F. A. McRAE.
DUMP CAR.
APPLICATION FILED JULY 3, 1917.
1,274,732.
Patented Aug. 6, 1918.
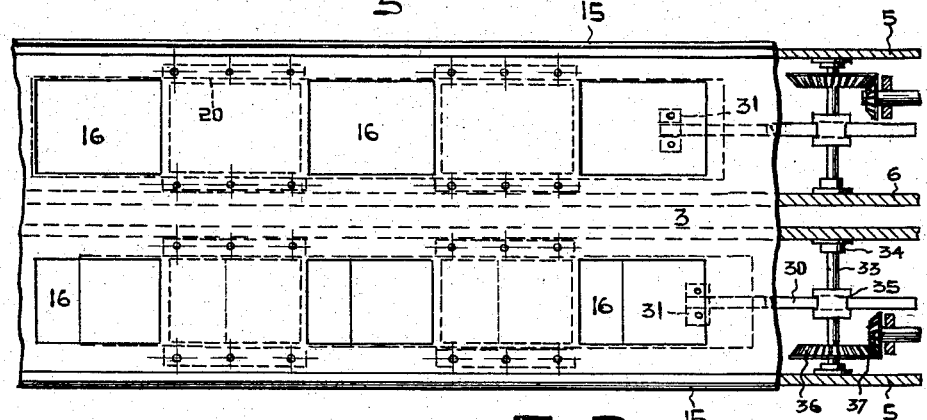
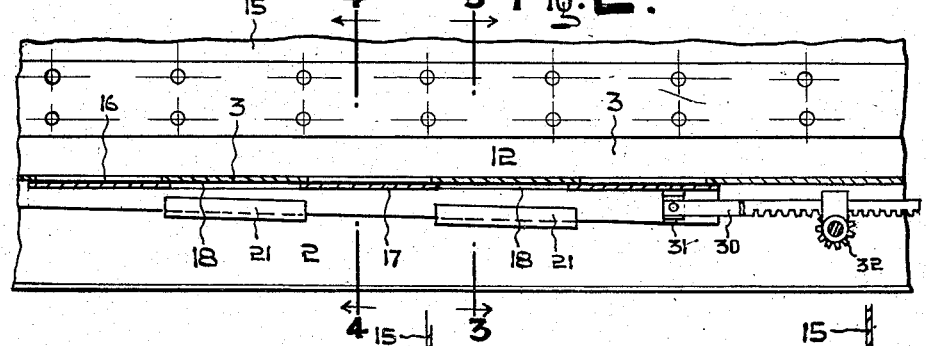
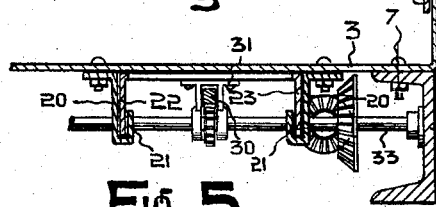
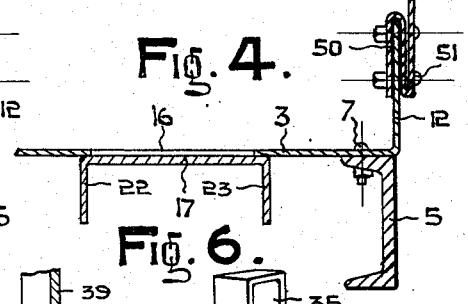
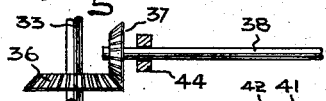
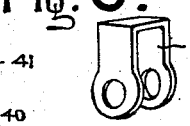
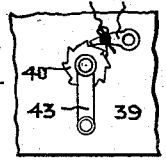
Witnesses:
Finlay A. McRae
Inventor.
per Attorney

UNITED STATES PATENT OFFICE.

FINLAY A. McRAE, OF MONTREAL, QUEBEC, CANADA.

DUMP-CAR.

1,274,732.   Specification of Letters Patent.   Patented Aug. 6, 1918.

Application filed July 3, 1917. Serial No. 178,518.

*To all whom it may concern:*

Be it known that I, FINLAY ALEXANDER MCRAE, a subject of the King of Great Britain, residing in the city of Montreal, the Province of Quebec, Dominion of Canada, have invented certain new and useful Improvements in Dump-Cars, and do hereby declare that the following is a full, clear, and exact description thereof.

My invention has for its object to provide a flat dumping car with a detachable housing and means for attaching the same to the car along the edges of the latter.

To this end the invention may be said to consist of a flat car consisting of a unitary platform having turned up outside edges and a pair of parallel series of dumping ports each series being controlled by a door slidable longitudinally relatively to the length of the car and operated from one end thereof; and a housing the lower edges of which are adapted to straddle the turned up portions of the platform.

For full comprehension, however, of my invention references must be had to the accompanying drawings forming a part of this specification in which similar reference numerals indicate the same parts, and wherein:—

Figure 1 is a plan view of a car constructed according to my invention;

Fig. 2 is a longitudinal sectional view taken on a line bisecting one of the series of discharge openings;

Fig. 3 is a transverse sectional view taken on line 3—3 Fig. 2;

Fig. 4 is a transverse sectional view taken on line 4—4 Fig. 2;

Fig. 5 is a detail view of the means for operating the doors;

Fig. 6 is a detail perspective view of one of the members forming part of the means for operating the doors, and Fig. 7 is an elevation of the crank arm and locking means for the doors.

The underframe of the car is indicated at 2, the floor at 3, and the housing at 15.

The underframe comprises the usual structural members, the side sills being indicated at 5 and the center sills at 6 for the purpose of illustrating the application of my invention thereto.

The floor is bolted to the underframe as at 7 and its outside edges relatively to the car are turned up in the form of flanges 12 which are constructed and arranged to support the housing 15 thereon.

Two longitudinal series of discharge openings 16 for the lading are formed in the floor and are controlled by a pair of sliding doors 17 movable longitudinally relatively to the car and having openings 18 adapted to register with the openings in the floor when the doors are in open position. The doors are supported in guides in the form of brackets 20 secured to the underside of the floor between the openings and their lower ends are turned up inwardly relative to the openings to present guideways 21. Each door is of inverted channel cross-section and the flanges 22 and 23 thereof are adapted to rest within the guideways 21. In order to provide a tight joint between the doors and floor when the former are in closed position the guideways 21 are inclined slightly and the flanges 22 and 33 correspondingly tapered so that when in the open position the doors will not be in bearing relation with the underside of the floor but when in the closed position they will be clamped in tight contact with the same.

Each door is constructed and arranged to be reciprocated by a rack 30, one end of which is pivoted in a bracket 31 secured to the underside of the door, and a pinion 32 intermeshing with the rack and being mounted upon a transverse shaft 33 journaled in brackets secured to the side and center sills. A member 35 of saddle-form is mounted upon this shaft and straddles the rack and pinion for the purpose of keeping them in operative engagement. A bevel gear 36 is mounted upon the shaft 33 and is adapted to be driven by another bevel gear 37 intermeshing with it. This other bevel gear is carried by a shaft 38 extending at right angles to the first mentioned shaft and projects beyond the adjacent end sill 39. Upon this projecting end a ratchet wheel 40 is mounted and is constructed and arranged to be engaged by a pawl 41 pivoted to the end sill. The pawl may be locked and sealed by a pin 42 pushed through an opening in the sill immediately above the pawl. The shaft 38 is rotated by a crank arm 43 on the free end thereof. The opposite end of the shaft just mentioned is journaled in a bracket 44 secured to the floor.

The housing 15 is preferably of the type illustrated in my pending application, Serial No. 67,409 and only that portion which bears directly upon the floor is illustrated.

In order to provide a connection between the floor and housing which will prevent leakage of the lading and be readily detachable, the lower edges of the housing are bent in the form of a double fold to present a downwardly facing channel 50. The flanges 12 are adapted to project into this channel when the housing is in position thereon the sides of the folds straddling the flanges. The whole is secured by bolts 51 passing through the flanges and folds.

What I claim is as follows:—

In a railway car a floor having two parallel series of openings therein arranged longitudinally relative to the car, the sides of the openings parallel to the sides of the car being extended downwardly and turned up to present guides, and a pair of slidable doors of inverted channel cross sections having their flanges slidably mounted in the guides, the guides being inclined and the flanges tapered for the purpose of causing the doors to move into tight contact with the floor, when closing the openings, means for opening and closing the doors and means coacting with the last-mentioned means for locking the doors in closed position.

In testimony whereof I have signed my name to this specification in the presence of two witnesses.

FINLAY A. McRAE.

Witnesses:
 GORDON G. COOKE,
 WILLIAM J. C. HEWETSON.

Copies of this patent may be obtained for five cents each, by addressing the "Commissioner of Patents, Washington, D. C."